United States Patent [19]
Jaskie et al.

[11] Patent Number: 5,258,685
[45] Date of Patent: Nov. 2, 1993

[54] FIELD EMISSION ELECTRON SOURCE EMPLOYING A DIAMOND COATING

[75] Inventors: James E. Jaskie; Robert C. Kane, both of Scottsdale, Ariz.

[73] Assignee: Motorola, Inc., Schaumburg, Ill.

[21] Appl. No.: 883,448

[22] Filed: May 15, 1992

Related U.S. Application Data

[62] Division of Ser. No. 747,563, Aug. 20, 1991, Pat. No. 5,141,460, which is a division of Ser. No. 747,562, Aug. 20, 1991, Pat. No. 5,129,850.

[51] Int. Cl.$^5$ .................... H01J 1/02; H01J 1/15; H01J 1/16
[52] U.S. Cl. .................... 313/309; 313/336; 313/351; 313/355
[58] Field of Search ........... 313/309, 336, 351, 355

[56] References Cited

U.S. PATENT DOCUMENTS

| | | | |
|---|---|---|---|
| 3,921,022 | 11/1975 | Levine | 313/336 Y |
| 4,084,942 | 4/1978 | Villalobos | 313/336 X |
| 4,835,438 | 5/1989 | Baptist et al. | 313/336 |

*Primary Examiner*—Sandra L. O'Shea
*Attorney, Agent, or Firm*—Eugene A. Parsons

[57] ABSTRACT

A field emission electron emitter including a coating of diamond material disposed on a surface of a selectively formed conductive/semiconductive electrode wherein carbon ions are implanted at a surface of the electrode to function as nucleation sites for the diamond formation. A second field emission electron emitter is constructed by implanting carbon ions at a surface of a selectively shaped substrate to function as nucleation sites for the diamond formation. A conductive layer is deposited over the diamond and the substrate is removed to leave an electron emitter with a diamond coating.

8 Claims, 12 Drawing Sheets

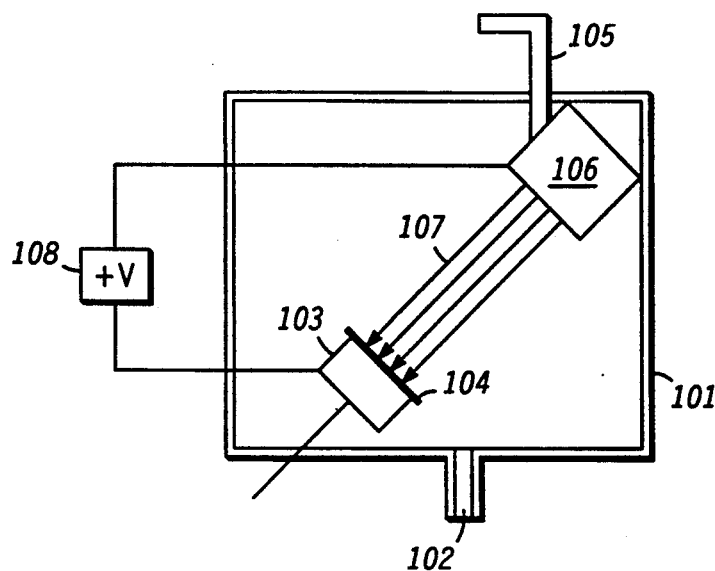
FIG. 1
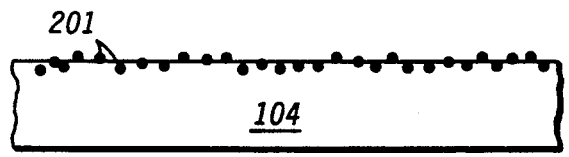
FIG. 2
FIG. 3
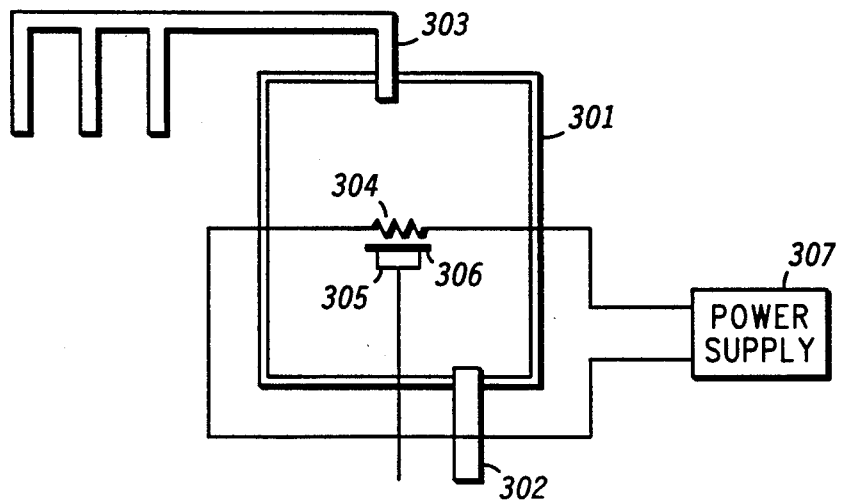

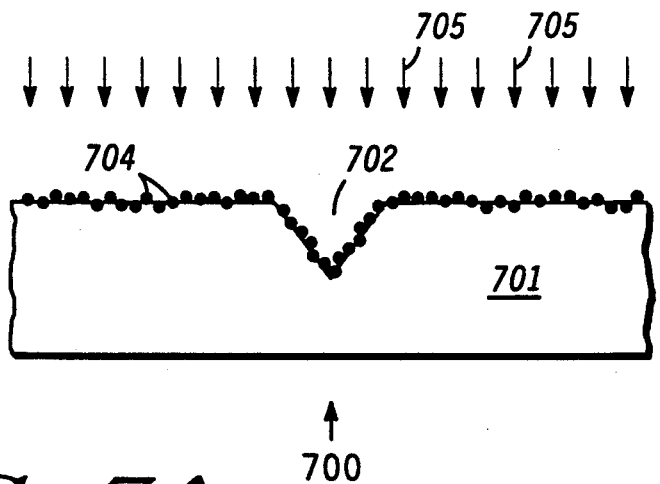
FIG. 7A
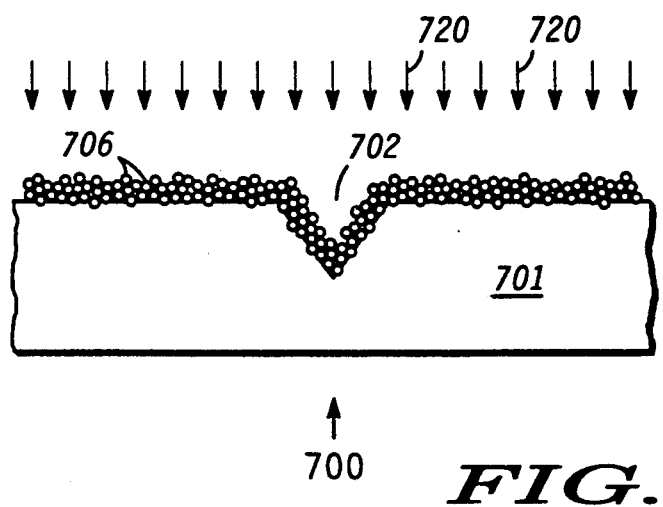
FIG. 7B
FIG. 7C
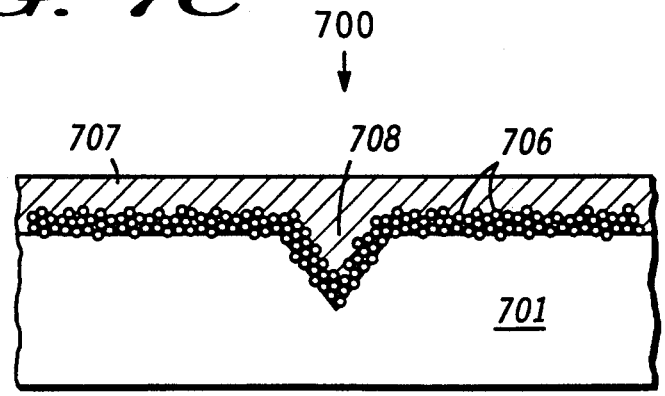

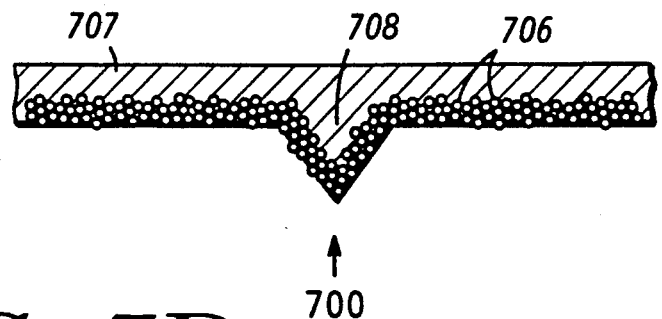
FIG. 7D
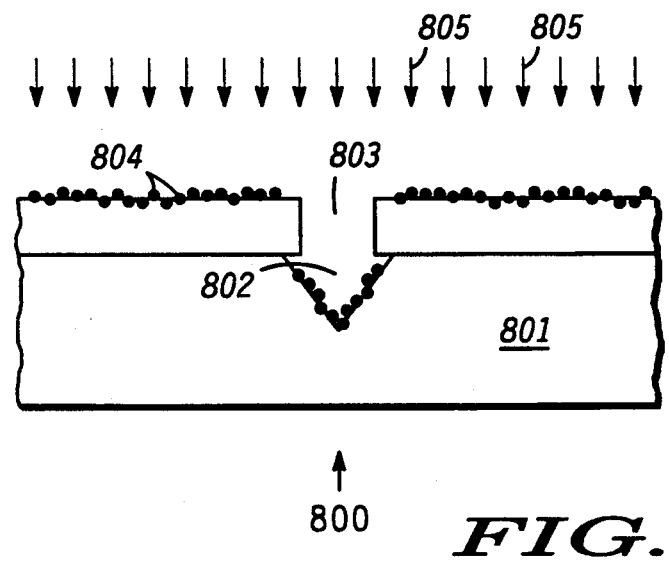
FIG. 8A
FIG. 8B
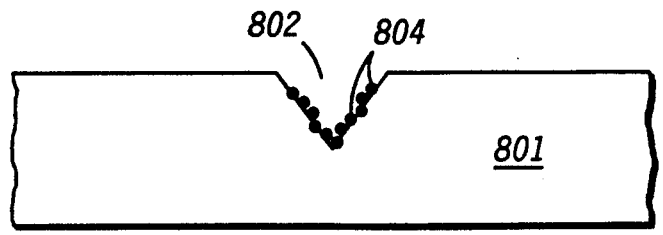

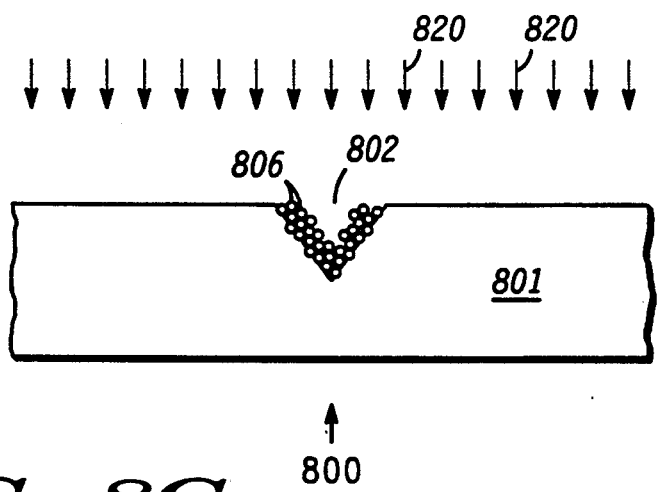
FIG. 8C
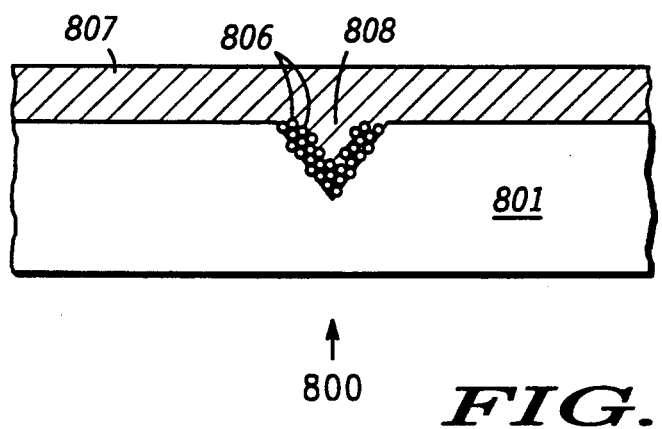
FIG. 8D
FIG. 8E
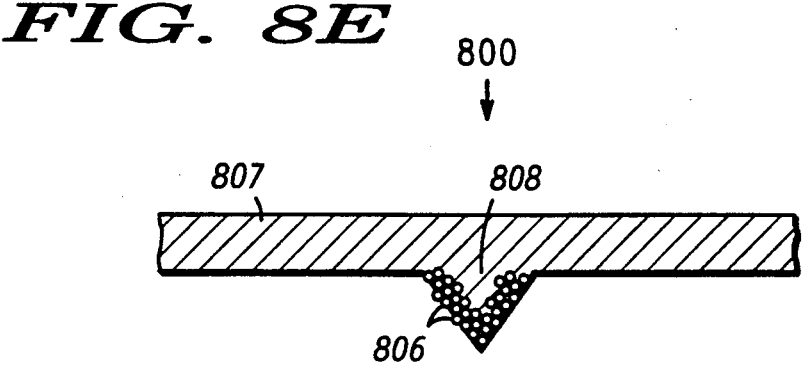

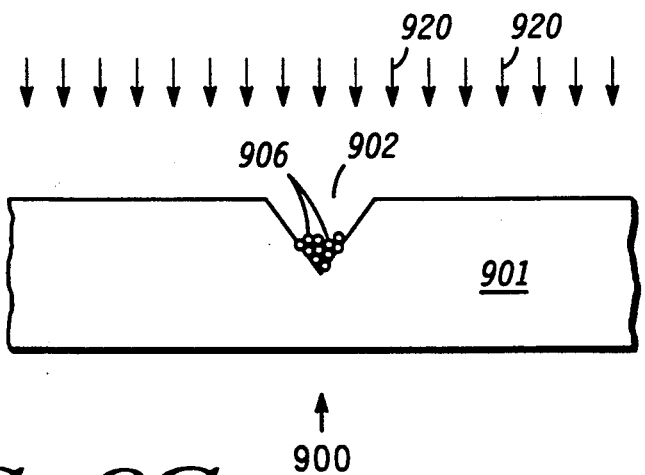
FIG. 9C
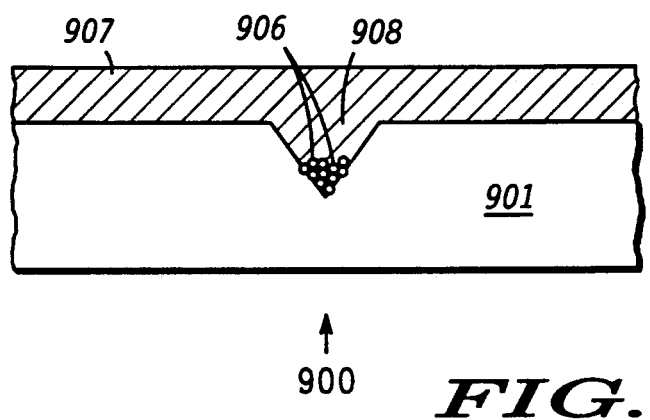
FIG. 9D
FIG. 9E
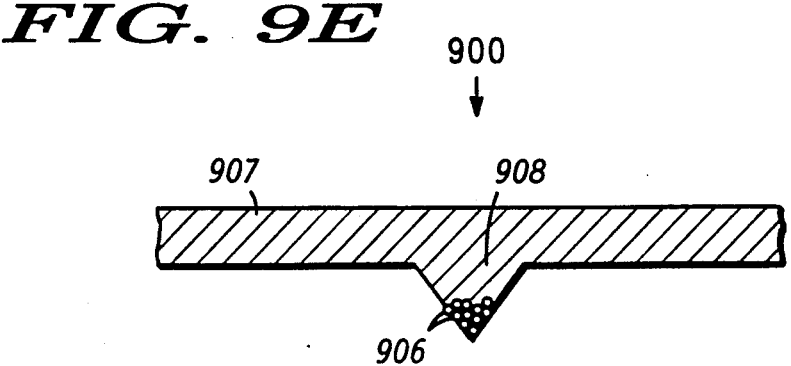

FIELD EMISSION ELECTRON SOURCE EMPLOYING A DIAMOND COATING

CROSS-REFERENCE TO RELATED APPLICATIONS

This is a division of application Ser. No. 07/747,563, filed Aug. 20, 1991, entitled "A Field Emission Electron Source Employing A Diamond Coating and Method For Producing Same" now U.S. Pat. No. 5,141,460 and application Ser. No. 07/747,562, filed Aug. 20, 1991, entitled "A Molded Field Emission Electron Emitter Employing A Diamond Coating and Method For Producing Same" now U.S. Pat. No. 5,129,850.

FIELD OF THE INVENTION

The present invention relates generally to field emission electron emitters and more particularly to field emission electron emitters and methods of producing field emission electron emitters employing low/negative electron affinity coatings.

BACKGROUND OF THE INVENTION

Field emission devices employing preferentially shaped conductive/semiconductive electrodes as electron emitters are known in the art. The prior art electron emitters are known to exhibit undesirable characteristics such as high operating voltages, surface instability, and susceptibility to ion bombardment damage.

Accordingly there exists a need for electron devices employing an electron emitter electron source which overcomes at least some of the shortcomings of the electron sources of the prior art.

SUMMARY OF THE INVENTION

This need and others are substantially met through provision of a field emission electron device including a field emission electron emitter with a selectively formed conductive/semiconductive electrode having a major surface, a plurality of ion implanted nucleation sites disposed on the major surface of the conductive/semiconductive electrode, and at least a first diamond crystallite disposed on the major surface of the conductive/semiconductive electrode and at a nucleation site of the plurality of nucleation sites, an emission controlling electrode proximally disposed with respect to the electron emitter for controlling the emission rate of electrons from the electron emitter, and an anode for collecting emitted electrons.

This need and others are further met through provision of a field emission electron emitter including in one embodiment of the present invention a diamond coating grown from carbon nucleation sites which have been disposed on at least a part of a selectively shaped substrate and in another embodiment of the present invention a field emission electron emitter having a diamond coating grown from carbon nucleation sites which have been selectively disposed on a part of a selectively shaped substrate.

BRIEF DESCRIPTION OF THE DRAWINGS

FIG. 1 is a schematic representation of ion implantation apparatus.

FIG. 2 is a cross sectional depiction of ion implantation.

FIG. 3 is a schematic representation of diamond growing environment apparatus.

FIGS. 7A-7D are side elevational depictions of structures which are realized by performing various steps of a method in accordance with the present invention.

FIGS. 8A-8E are side elevational depictions of structures which are realized by performing various steps of another method in accordance with the present invention.

FIGS. 9A-9E are side elevational representations of structures which are realized by performing various steps of yet another method in accordance with the present invention.

DETAILED DESCRIPTION OF THE PREFERRED EMBODIMENTS

Figure 4A:
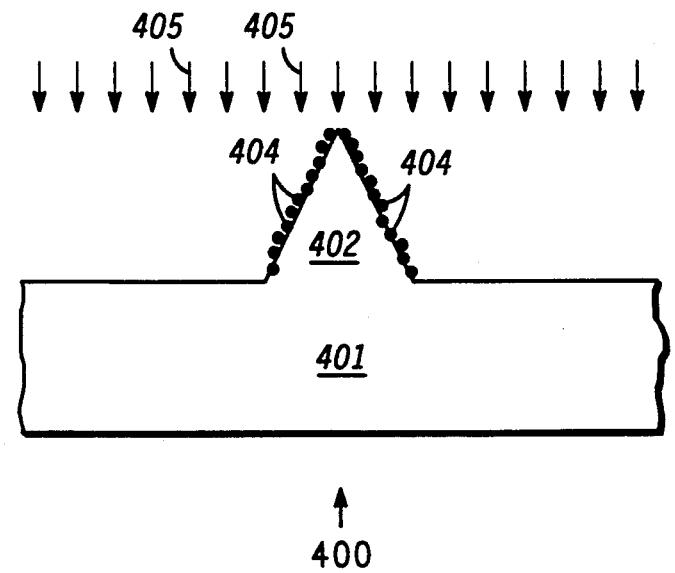
FIGS. 4A-4C are side elevational depictions of structures which are realized by performing various steps of a method in accordance with the present invention.

Referring now to FIG. 1 there is shown a representative schematical depiction of one embodiment of ion implantation apparatus. An evacuated enclosure 101 is provided wherein an ion source 106 and a substrate (target) holding fixture 103 are disposed. An ion material source aperture 105 is provided, as shown, to supply the ion source 106 with material. An evacuation port 102 is provided to which an evacuating device, not shown, may be operably coupled to evacuate enclosure 101. During operation of the implantation apparatus an ion beam 107 is directed to a target 104, due to an electric field which is induced by a voltage source 108, such that at least some of the ions which comprise the ion beam 107 are implanted in/on target 104.

FIG. 2 is a side elevational depiction of target (substrate) 104 whereon/wherein ions 201 have been implanted. Ions are selectively implanted to a desired depth in the material of target 104 depending on the strength of the associated accelerating electric field (not shown). Correspondingly, the electric field strength may be selected so that implanted ions will be substantially disposed at/on the surface of target 104.

FIG. 3 is a representative schematical depiction of one embodiment of diamond growing environment apparatus. An evacuated enclosure 301 is provided wherein a substrate (target) holder 305 and a heating element 304 are disposed. A source tube 303, which is a part of a gas supply manifold, provides a source of reactive gas constituents into the diamond growing environment. Enclosure 301 is suitably evacuated by operably coupling an evacuation pump (not shown) to an evacuation port 302. During operation a substrate 306 is disposed on substrate holder 305 to which heating element 304 is also proximally disposed. Power source 307 provides electrical current through heating element 304 to heat substrate 306 and in the presence of appropriate gas constituents a reaction occurs at the surface of substrate 306 during which diamond is grown.

Diamond growth is at least partially dependent on an ability to nucleate at the surface of a material. In many methods of diamond formation the nucleation is random and not well distributed giving rise to undesirable and incomplete film growth. Carbon ions implanted at/on a surface of substrate 306 provides a substantially uniformly distributed plurality of nucleation sites from which diamond growth is initiated.

Figure 4B:
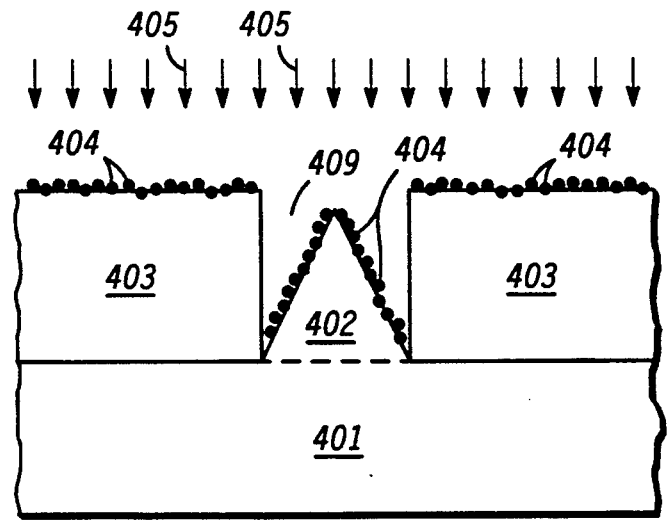

Referring now to FIG. 4A there is shown a side elevational depiction of a structure 400 which is realized by performing various steps in accordance with a method of the present invention. Structure 400 includes a selectively shaped layer 401 of conductive/semiconductive material, having at least a major surface, with the selective shaping, in this specific embodiment, being a generally conically shaped protrusion forming an electrode 402. Layer 401 is selectively shaped by any of many known techniques including, but not limited to, anisotropic etching and ion milling. A carbon ion beam, depicted by arrows 405, provides for implantation of carbon nucleation sites 404 at the major surface of electrode 402. Alternatively, and with reference to FIG. 4B, layer 401 is a supporting substrate which is provided with a layer 403 of patternable material, such as photoresist or insulator material, having at least one aperture 409 therethrough. Aperture 409 is selectively formed by preferentially patterning and developing photoresist or by preferentially etching insulator material as may be required. A conductive/semiconductive electrode 402 is substantially disposed within aperture 409 and on the layer 401. A carbon ion beam, depicted by arrows 405, provides for implantation of nucleation sites 404 at the conductive/semiconductive electrode 402, with the remainder of layer 401 being protected from implantation of nucleation sites 404 by layer 403. The layer of patternable material 403 may be removed subsequent to the implantation of nucleation sites 404.

Figure 4C:
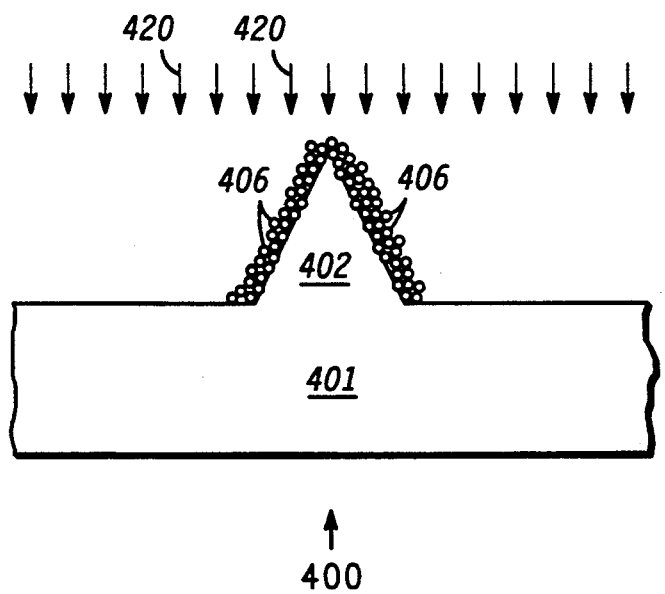

FIG. 4C is a side elevational depiction of structure 400 as described previously with reference to FIGS. 4A & 4B and having undergone additional steps of the method in accordance with the present invention. A source of reactant material, depicted by arrows 420, disposed in an intervening region between conductive/semiconductive electrode 402 and a proximal heating element (element 304 described previously with reference to FIG. 3) gives rise to growth of diamond crystallite 406 preferentially at the implanted carbon nucleation sites.

The resultant conductive/semiconductive electrode 402 on which is disposed a coating of diamond crystallite 406 comprises a field emission electron emitter exhibiting a number of desirable operating characteristics including reduced voltage operation, improved surface stability, and reduced susceptibility to ion bombardment damage. Incorporation of implanted carbon nucleation sites 404 provides a mechanism for improved diamond crystallite coverage and discourages the formation of a non-uniform coating which may include undesirably large crystallite growth.

Figure 5A:
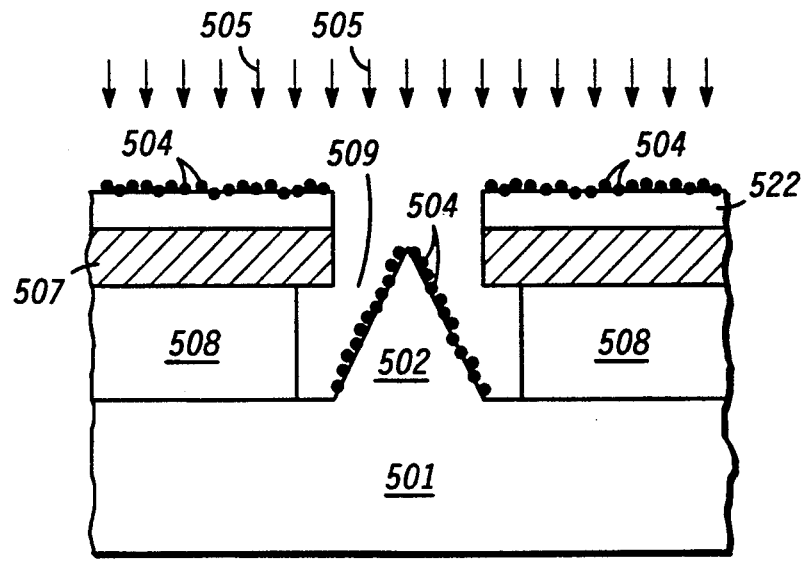
FIGS. 5A-5D are side elevational depictions of structures which are realized by performing various steps of another method in accordance with the present invention.

FIG. 5A is a side elevational depiction of a structure 500 which is realized by performing steps of another method in accordance with the present invention. A supporting substrate 501 is provided. A layer 508 of insulator material having an aperture 509 formed therethrough is disposed on supporting substrate 501. A conductive/semiconductive electrode 502, formed as described previously with reference to FIGS. 4A & 4B, is disposed within aperture 509 and on supporting substrate 501. A layer 507 of conductive/semiconductive material is disposed on layer 508 substantially conformally with respect to aperture 509 such that aperture 509 is further defined through layer 507. A layer 522 of patternable material is deposited on layer 507. A carbon ion beam, depicted by arrows 505, provides for implantation of nucleation sites 504 at conductive/semiconductive electrode 502. Layer 522 may be removed subsequent to the implantation of the nucleation sites 504.

Figure 5B:
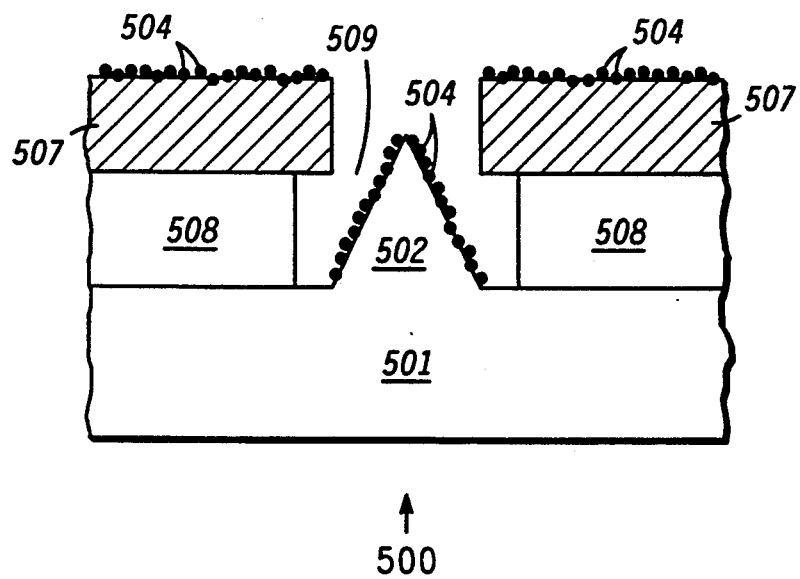

Alternatively, and with reference to FIG. 5B, patternable layer 522 described in FIG. 5A is omitted with the result that at least some nucleation sites 504 are deposited on the conductive/semiconductive layer 507.

Figure 5C:
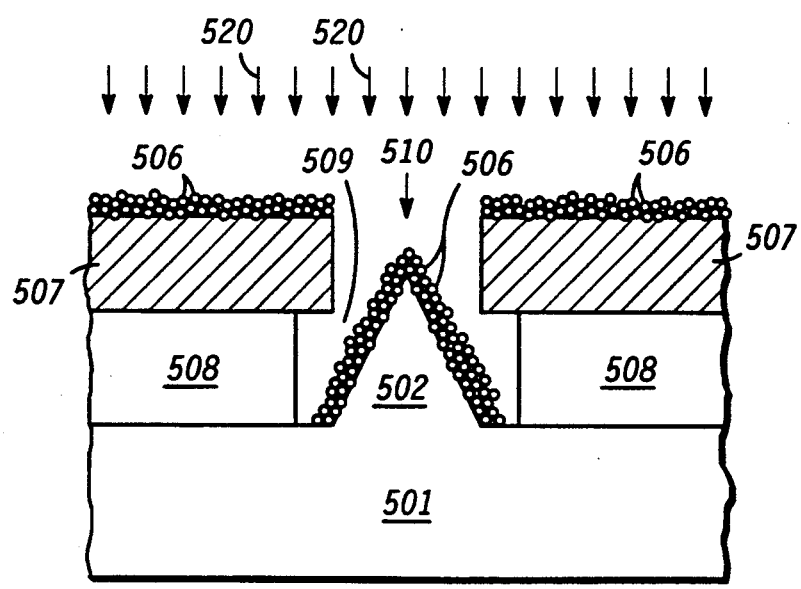

FIG. 5C is a side elevational depiction of structure 500 as described previously with reference to FIGS. 5A & 5B and having undergone additional steps of the method. A source of reactant material, depicted by arrows 520, disposed in an intervening region between conductive/semiconductive electrode 502 and a proximal heating element (see FIG. 3), gives rise to growth of diamond crystallite 506 preferentially at the implanted carbon nucleation sites. The combination of conductive/semiconductive electrode 502 with a coating of diamond nucleation sites 506 produces an improved electron emitter 510.

Figure 5D:
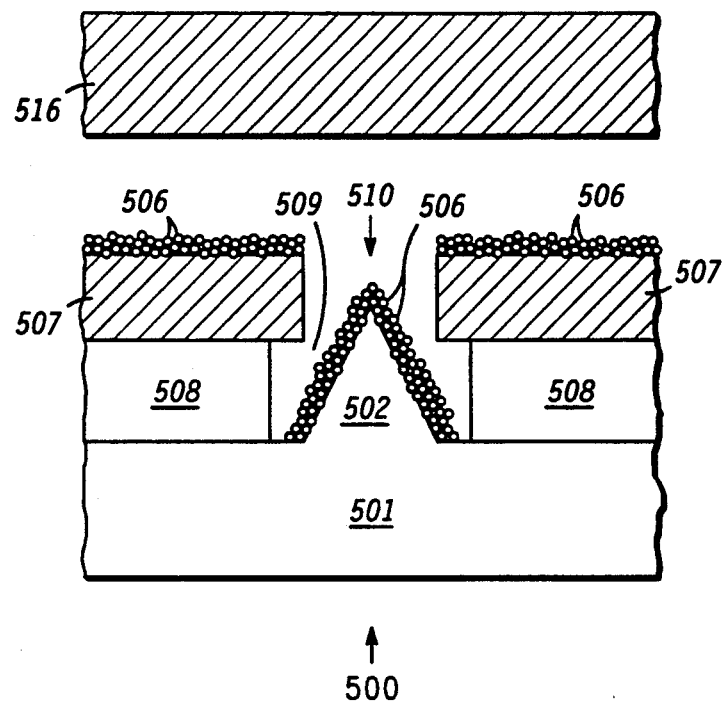

FIG. 5D is a side elevational depiction of structure 500 described previously with reference to FIG. 5C and further comprising an anode 516, distally disposed with respect to electron emitter 510, for collecting any electrons which are emitted by electron emitter 510. Layer 507, since it is formed of conductive/semiconductive material, functions as an emission controlling electrode for controlling the rate of electrode emission. A field emission device (structure 500) employing an electron emitter comprised of a diamond coating, formed in accordance with the method of the present invention described in FIG. 5D, may be employed advantageously in applications known in the art. Utilizing implanted nucleation sites from which diamond crystallite growth may be initiated provides for a more uniform coating. Since coating thicknesses on the order of 10Å to less than 5000Å are desirable it is an important feature of coating formation that irregularities in coating thickness and coverage be minimized. Other methods of realizing diamond film growth do not provide for substantially uniform growth thickness and coverage.

Figure 6A:
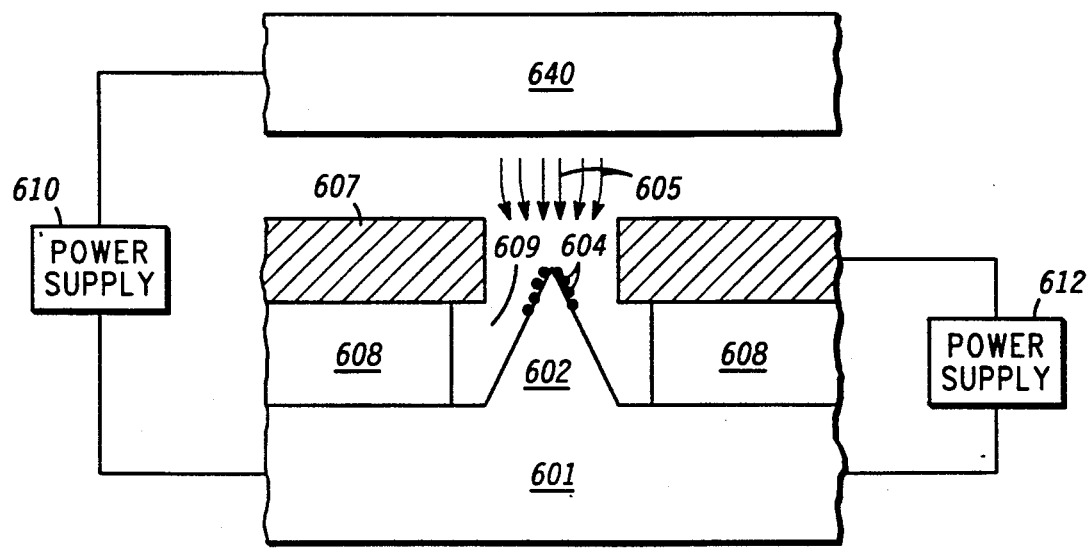
FIGS. 6A-6E are side elevational representations of structures which are realized by performing various steps of yet another method in accordance with the present invention.

FIG. 6A is a side elevational depiction of a structure 600, similar to that described previously with reference to FIG. 5B, wherein similar features initially described in FIG. 5B are similarly referenced beginning with the numeral "6". FIG. 6A further depicts that an ion implantation source 640 provides an ion beam 605 from which carbon nucleation sites 604 are implanted on the conductive/semiconductive electrode 602. In the instance of FIG. 6A, an externally provided voltage source 610 is operably coupled between ion implantation source 640 and supporting substrate 601. A second externally provided voltage source 612 is operably coupled between conductive/semiconductive layer 607 and supporting substrate 601. Alternatively, the structure of FIG. 6A may employ a conductive/semiconductive electrode formed as described previously with reference to FIG. 4A. By applying a suitable voltage to conductive/semiconductive layer 607, ions which comprise the ion beam 605 are preferentially repelled from the region proximal to the periphery of conductive/semiconductor layer 607 and correspondingly toward a preferred small part of the surface of conductive/semiconductive electrode 602. This redirection of ion beam 605 results in implantation of nucleation sites 604 substantially at only a preferred part of the surface of conductive/semiconductive electrode 602.

Figure 6B:
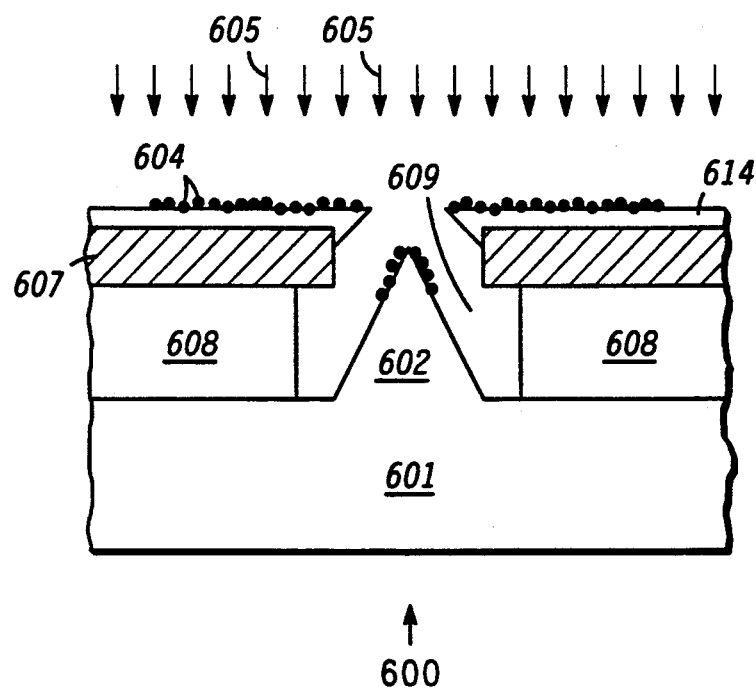

FIG. 6B is a side elevational view of structure 600 wherein a different feature is utilized to obtain the results described in FIG. 6A. In this modified method aperture 609 is partially closed by employing a low angle material deposition, as is known in the art, to provide a partial closure layer 614. A carbon ion beam, depicted by arrows 605, provides for implantation of nucleation sites 604 at conductive/semiconductive electrode 602.

Figure 6C:
Figure 6C:
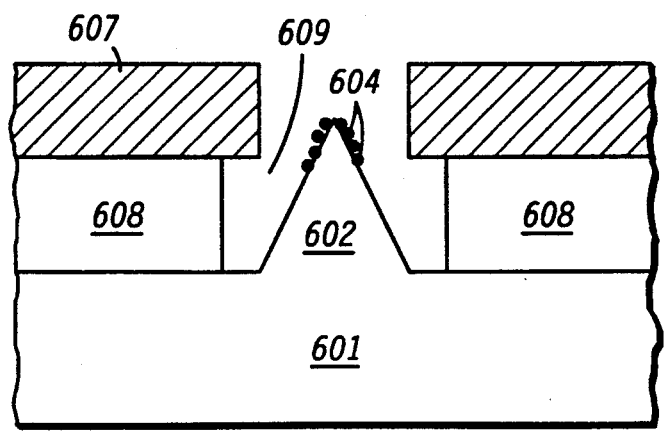

FIG. 6C depicts structure 600 after having undergone an additional process step wherein closure layer 614 is removed.

Figure 6D:
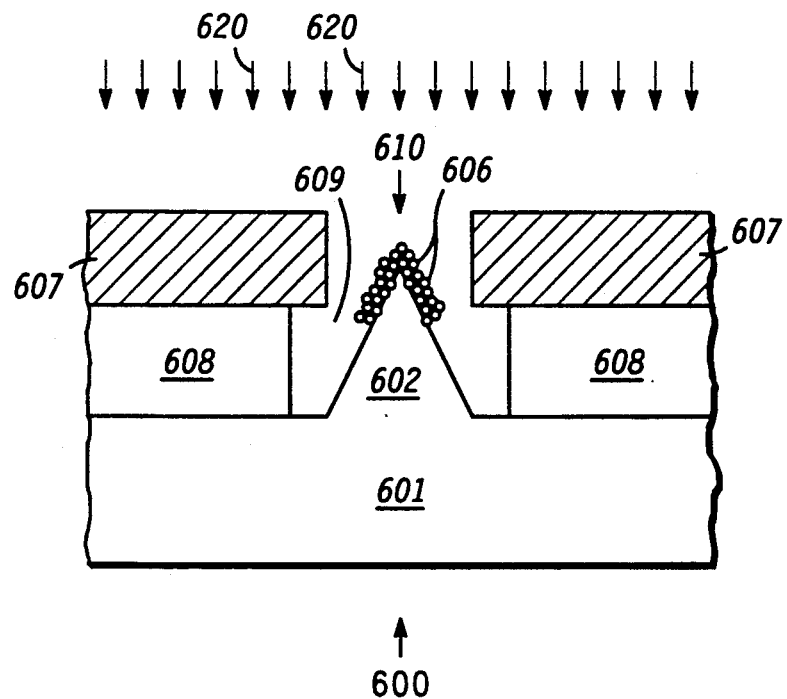

FIG. 6D is a side elevational depiction of structure 600 having undergone additional steps of the method wherein a source of reactant material, depicted by arrows 620, disposed in an intervening region between conductive/semiconductive electrode 602 and a proximal heating element (see FIG. 3), gives rise to growth of diamond crystallite 606 preferentially at the implanted carbon nucleation sites. In the instance of the structure of FIG. 6D the diamond crystallite growth takes place preferentially on only a part of the exposed part of conductive/semiconductive electrode 602. The combination of conductive semiconductive electrode 602 with the coating diamond crystallite 606 forms an improved electron emitter 610.

Figure 6E:
Figure 6E:
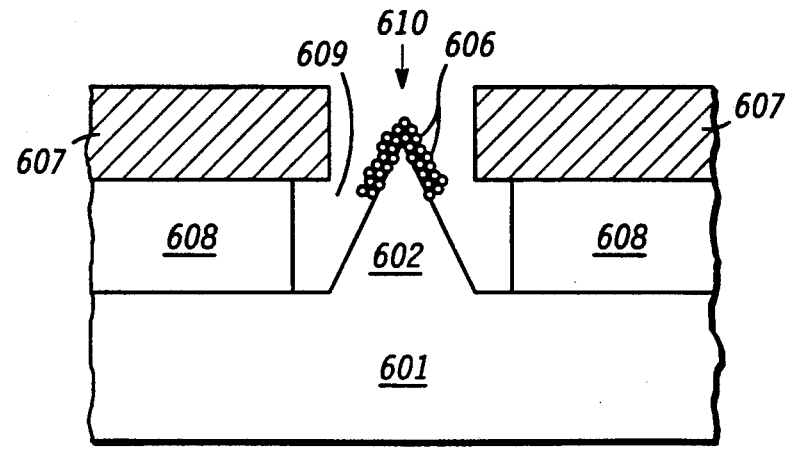

FIG. 6E is a side elevational depiction of structure 600 further comprising an anode 616 distally disposed with respect to electron emitter 610 for collecting electrons which are emitted by electron emitter 610. Conductive/semiconductive layer 607 functions as an emission controlling electrode for controlling the rate of electrode emission. The field emission device employing an electron emitter including a diamond coating, formed in accordance with the method of the present invention described in FIGS. 6A–6E, may be employed advantageously in applications known in the art. Utilizing implanted nucleation sites from which diamond crystallite growth is initiated provides for a more uniform coating. Since coating thicknesses on the order of 10Å to less than 5000Å are desirable it is an important feature of coating formation that irregularities in coating thickness and coverage be minimized. Other methods of realizing diamond film growth do not provide for substantially uniform growth thickness and coverage.

Referring now to FIG. 7A, there is shown an enlarged side elevational depiction of a structure 700 which is realized by performing various steps in accordance with a method of the present invention. Structure 700 includes a selectively shaped supporting layer or layers, hereinafter substrate 701, having a major surface, wherein substrate 701 is selectively shaped by any of many known techniques including, but not limited to, anisotropic etching and ion milling, to provide a selectively shaped region, which in this embodiment is a generally notch shaped depression 702. A carbon ion beam, depicted by arrows 705, provides for implantation of carbon nucleation sites 704 at substrate 701.

FIG. 7B is a side elevational depiction of structure 700 having undergone additional steps of the method in accordance with the present invention wherein a source of reactant material, depicted by arrows 720, disposed in an intervening region between substrate 401 and a proximal heating element (304 in FIG. 3) gives rise to growth of a diamond crystallite coating 706 preferentially at the implanted carbon nucleation sites.

FIG. 7C is a side elevational depiction of structure 700 having undergone an additional step of the method wherein a layer of conductive/semiconductive material 707 is deposited onto any exposed part of the major surface of substrate 701 and onto diamond crystallite coating 706. Conductive/semiconductive material 707 is deposited so as to fill depression 702 with a projection 708.

FIG. 7D is a side elevational depiction of structure 700 having undergone an additional process step in accordance with the method of the present invention wherein at least some of substrate 701 has been removed. Removal of substrate 701 material effectively exposes the layer of conductive/semiconductive material 707, and especially exposes projection 708, on which is disposed diamond crystallite coating 706. It should be understood that the material or materials of substrate 701 and the conductive/semiconductive material 707 are chosen so that substrate 701 can be relatively easily removed, by some method such as etching, dissolving or the like, without substantially effecting crystallite coating 706 or conductive/semiconductive material 707.

The resultant structure, which includes a coating of diamond, comprises a field emission electron emitter exhibiting a number of desirable operating characteristics including reduced voltage operation, improved surface stability, and reduced susceptability to ion bombardment damage. Incorporation of implanted carbon nucleation sites provides a mechanism for improved diamond crystallite coverage and discourages the formation of a non-uniform coating which may include undesirably large crystallite growth.

FIG. 8A is an enlarged side elevational depiction of a structure 800 which is realized by performing steps of another method in accordance with the present invention. A supporting layer or substrate 801 having a major surface is provided. A layer of patternable material 809, such as photoresist or insulator material, is disposed on substrate 801. Subsequently, layer of patternable material 809 is selectively exposed and developed to provide at least one aperture 803 through which selective anisotropic shaping of substrate 801 is performed to provide a selectively shaped region, which in this embodiment is a generally notch shaped depression 802. A carbon ion beam, depicted by arrows 805, provides for implantation of nucleation sites 804 in depression 802 of substrate 801.

FIG. 8B is a side elevational depiction of structure 800 showing layer of patternable material 809 removed subsequent to the implantation of nucleation sites 804.

FIG. 8C is a side elevational depiction of structure 800 having undergone additional steps of the method wherein a source of reactant material, depicted by arrows 820, disposed in an intervening region between substrate 801 and a proximal heating element (see FIG. 3), gives rise to growth of diamond crystallite 806 preferentially at the implanted carbon nucleation sites.

FIG. 8D is a side elevational depiction of structure 800 having undergone an additional step of the method wherein a layer of conductive/semiconductive material 807 is deposited onto any exposed part of the major surface of substrate 801 and onto diamond crystallite 806. Conductive/semiconductive material 807 is deposited so as to fill depression 802 with a projection 808.

FIG. 8E is a side elevational view of structure 800 having undergone an additional step of the method of the present invention wherein at least some of substrate 801 has been removed. Removal of substrate 801 material effectively exposes the layer of conductive/semiconductive material 807, and especially exposes projection 808, on which is disposed diamond crystallite 806.

Utilizing implanted nucleation sites from which diamond crystallite growth may be initiated provides for a more uniform coating. Since coating thicknesses on the order of 10Å to less than 5000Å are desirable it is an important feature of coating formation that irregularities in coating thickness and coverage be minimized. Other methods of realizing diamond film growth do not provide for substantially uniform growth thickness and coverage.

Figure 9A:
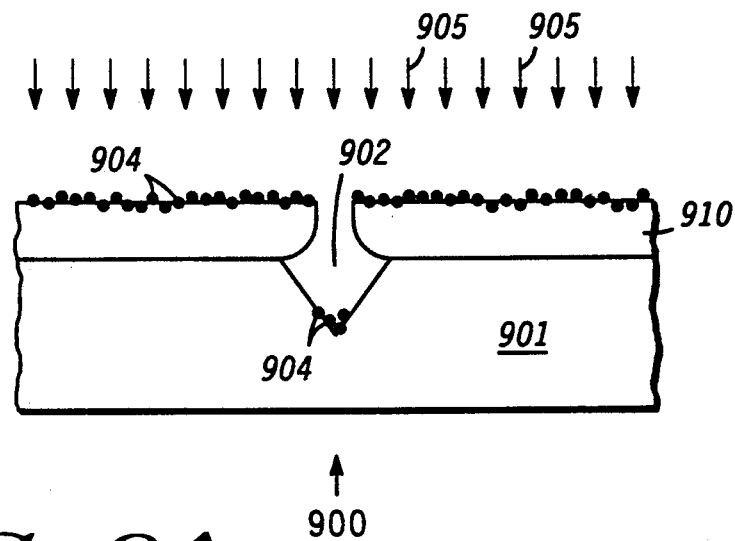

FIG. 9A is a side elevational depiction of a structure 900 constructed by yet another method in accordance with the present invention. Structure 900 is similar to structure 800 described previously with reference to FIG. 8B, wherein similar features initially described in FIG. 8B are similarly referenced beginning with the numeral "9". FIG. 9A further depicts a low angle material evaporation employed to deposit material 910 onto a substrate 901 so that a selectively shaped region 902 of substrate 901 is partially closed over. FIG. 9A further illustrates an ion beam, depicted by arrows 905, from which carbon nucleation sites 904 are implanted in selectively shaped region 902 of substrate 901 and substantially at a preferred part of selectively shaped region 902, in this specific embodiment the tip of the notch.

Figure 9B:
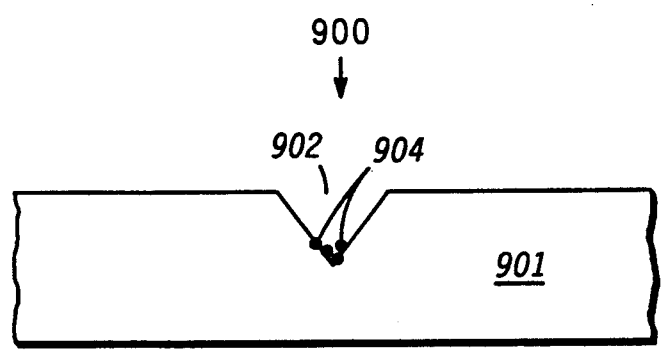

FIG. 9B depicts structure 900 having undergone an additional process step wherein material 910 has been removed.

FIG. 9C is a side elevational depiction of structure 900 having undergone additional steps of the method wherein a source of reactant material, depicted by arrows 920, disposed in an intervening region between the substrate 901 and a proximal heating element (see FIG. 3), gives rise to growth of diamond crystallite 906 preferentially at the implanted carbon nucleation sites. In the instance of the structure of FIG. 9C the crystallite growth takes place preferentially on only a part of the exposed surface of substrate 901 and, more specifically, in the extreme tip of selectively shaped region 902.

FIG. 9D is a side elevational depiction of structure 900 having undergone an additional step of the method wherein a layer of conductive/semiconductive material 907 is deposited onto any exposed part of the major surface of substrate 901 and onto diamond crystallite 906. Conductive/semiconductive material 907 is deposited so as to fill selectively shaped region 902 with a projection 908.

FIG. 9E is a side elevational view of structure 900 having undergone an additional step of the method of the present invention wherein at least some of substrate 901 has been removed. Removal of substrate 901 material effectively exposes the layer of conductive/semiconductive material 907, and especially exposes projection 908, on the tip of which is disposed diamond crystallite 906.

The methods described provide for electron emitter structures which, when employed in field emission devices, exhibit operating characteristics not attainable by means known in the prior art. Field emission devices employing electron emitters, formed by methods of the present invention, provide for improved operation, increased stability, and longer lifetime devices. The diamond coating, of the electron emitter, exhibits a much lower work function, derived from an inherent low/negative electron affinity, and a more stable crystalline structure than may be realized by using materials previously employed for electron emitters.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What we claim is:

1. A field emission electron emitter comprising:
   a selectively formed conductive/semiconductive electrode having a major surface;
   a plurality of ion implanted nucleation sites disposed on the major surface of the conductive/semiconductive electrode; and
   at least a diamond crystallite disposed on the major surface of the conductive/semiconductive electrode and at a nucleation site of the plurality of nucleation sites.

2. A field emission electron emitter comprising:
   a selectively formed conductive/semiconductive electrode having a major surface;
   a plurality of ion implanted nucleation sites disposed on the major surface of the conductive/semiconductive electrode; and
   a substantially uniform diamond coating disposed on at least a part of the major surface of the conductive/semiconductive electrode.

3. A field emission electron device comprising:
   a field emission electron emitter including
      a selectively formed conductive/semiconductive electrode having a major surface; and
      a plurality of ion implanted nucleation sites disposed on the major surface of the conductive/semiconductive electrode; and
      at least a first diamond crystallite disposed on the major surface of the conductive/semiconductive electrode and at a nucleation site of the plurality of nucleation sites;
   an emission controlling electrode proximally disposed with respect to the electron emitter for controlling the emission rate of electrons from the electron emitter; and
   an anode for collecting emitted electrons.

4. A field emission electron device comprising:
   a field emission electron emitter including
      a selectively formed conductive/semiconductive electrode having a major surface;
      a plurality of ion implanted nucleation sites disposed on the major surface of the conductive/semiconductive electrode; and
      a substantially uniform diamond coating disposed on at least a part of the major surface of the conductive/semiconductive electrode;
   an emission controlling electrode proximally disposed with respect to the electron emitter for controlling the emission rate of electrons from the electron emitter; and
   an anode for collecting at least some of any emitted electrons.

5. An electron emitter comprising:
   a selectively formed conductive/semiconductive electrode having a major surface;
   a plurality of ion implanted carbon nucleation sites disposed on the major surface of the conductive/semiconductive electrode; and
   at least a diamond crystallite disposed on the major surface of the conductive/semiconductive electrode and at a carbon nucleation site of the plurality of carbon nucleation sites.

6. A field emission electron emitter comprising:
a layer of conductive/semiconductive material; and
a diamond coating disposed on at least a part of the layer of conductive/semiconductive material.

7. A field emission electron emitter as claimed in claim 6 wherein the layer of conductive/semiconductive material is formed with a relatively sharp projection having an extended tip and the diamond coating is disposed on the extended tip.

8. A field emission electron emitter as claimed in claim 6 wherein the diamond coating includes a substantially uniformly distributed plurality of diamond crystallites.

* * * * *